Dec. 31, 1940.  G. Z. VON MANTEUFFEL  2,227,371
GYROSCOPIC APPARATUS
Filed Dec. 23, 1937  4 Sheets—Sheet 1

Inventor:
G. Z. von Manteuffel.

Dec. 31, 1940.    G. Z. VON MANTEUFFEL    2,227,371
GYROSCOPIC APPARATUS
Filed Dec. 23, 1937    4 Sheets-Sheet 3

Inventor:
G. Z. von Manteuffel

Patented Dec. 31, 1940

2,227,371

UNITED STATES PATENT OFFICE 2,227,371

GYROSCOPIC APPARATUS

Gert Zoege von Manteuffel, Berlin-Dahlem, Germany, assignor to Askania-Werke A. G. vormals Centralwerkstatt-Dessau und Carl Bamberg-Friedenau, a corporation of Germany Application December 23, 1937, Serial No. 181,439
In Germany December 23, 1936

9 Claims. (Cl. 74—5)

This invention relates to improvements in gyroscopic apparatus, more particularly to gyroscopes having three degrees of freedom and combined with relays for actuating remote indicators or an automatic steering device.

A gyroscope having three degrees of freedom and represented for example by the gyro vertical or the directional gyroscope usually includes, as is well-known in the art, a gimbal ring in which the rotor bearing member or casing is mounted about an inner or minor axis at right angles to the spinning axis of the gyro rotor, while the gimbal ring is mounted for movements about a major or outer axis at right angles to the inner or minor axis. Where a relay is to be actuated in response to movements of the gyroscope about the inner or minor axis, a problem is presented as to how to actuate the relay from the gyroscope proper without exerting a reaction on the same and without moving relatively heavy parts.

It is an object of this invention to provide a simple and reliable gyroscopic apparatus in combination with a relay which is actuated in response to movements of the gyroscope about its minor axis.

According to this invention a motion transmitting member is provided for actuating the relay, the motion transmitting member being coaxially arranged with the major axis of the gimbal ring and moved in axial direction in response to movements of the rotor bearing member or casing about the minor axis.

Further aims, objects, and advantages of this invention will appear from a consideration of the description which follows with the accompanying drawings showing for purely illustrative purposes embodiments of this invention. It is to be understood, however, that the description is not to be taken in a limiting sense, the scope of this invention being defined in the appended claims.

Referring to the drawings.

Figure 1:
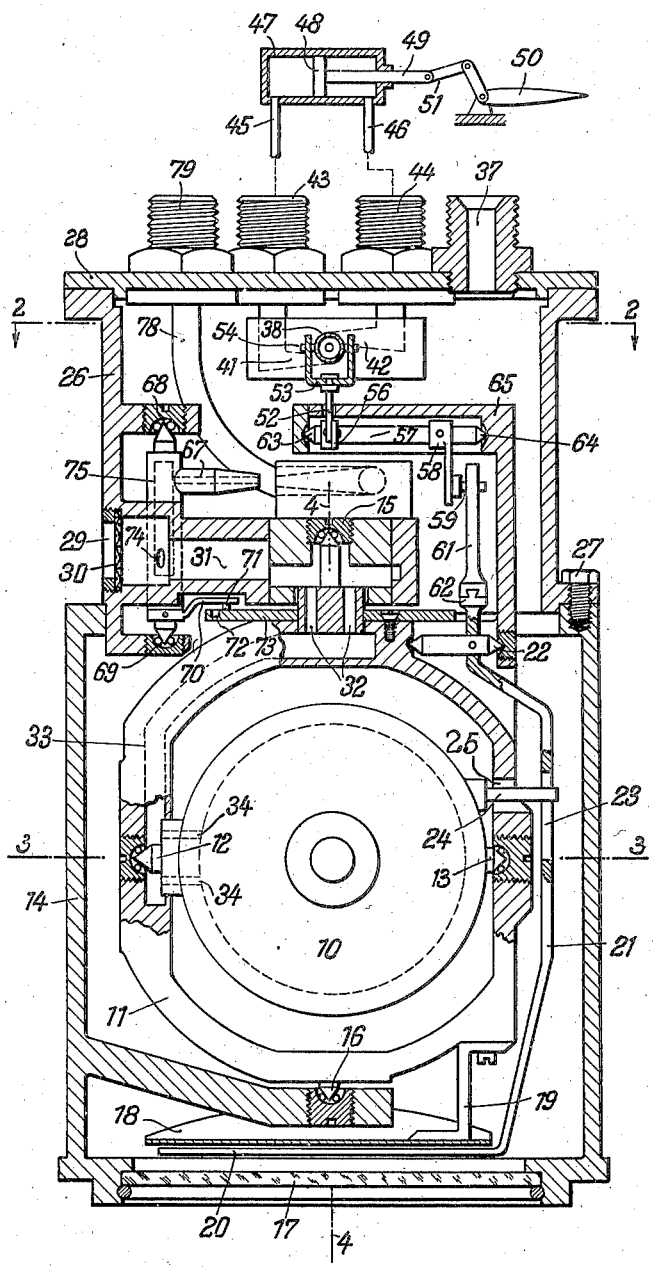
Fig. 1 is a sectional plan view of a gyroscope according to this invention.

A rotor bearing member or casing 10 is mounted in a gimbal ring 11 for movement about a minor axis 3—3 in antifriction bearings 12 and 13. The gimbal ring 11, in turn, is mounted in the front part 14 of the instrument casing in a bearing 16 and in the rear part 26 of the casing secured thereto in a bearing 15. The bearings 15 and 16 define the major axis 4—4.

The front part 14 of the instrument casing may be provided with a front window 17 behind which a mask 18 is visible. The mask 18 is connected to the gimbal ring by means of a bracket 19 causing the mask to move with the gimbal ring. A pointer 20 secured to or integral with an arm 21 may be provided for indicating movements of the gyroscope about the minor axis 3—3. In the illustrated embodiment the arm 21 is pivoted at 22 and provided with a slot 23 into which a pin 24 of the rotor bearing casing 10 projects. The pointer 20 is accordingly caused to move relatively to the mask giving indications of the gyroscope about its minor axis. A slot 25 in the rotor bearing member permits of movements of the pin 24 about the axis 3—3.

To the front part 14 of the instrument casing a rear part 26 is secured by means of screws 27, the rear end of the casing 26 being closed by a cover 28.

Air at atmospheric pressure enters the casing through an aperture 29 provided with a filter 30 in the rear part of the casing and passes through a channel 31 and passages 32 into a conduit 33 in the gimbal ring 11, whence it enters through similar passages 34 in the bearing 12 into the rotor bearing casing 10. From the rotor bearing casing air escapes through apertures or ports 35 controlled by the usual pendulous shutters 36 and is withdrawn from the interior of the instrument casing through a pipe coupling 37.

A relay or pick-off is provided to be actuated in response to movements of the gyroscope about the minor axis 3—3. In the illustrated embodiment a pick-off of the well-known Askania jet-pipe type is shown comprising a jet-pipe 38 pivoted at 39 and supplied with air at atmospheric pressure through a conduit 40. The jet-pipe issues a jet of air into reception orifices 41 and 42 depending upon the relative position of the jet-pipe and the orifices. Pipe couplings 43 and 44 are provided for connecting conduits to the reception orifices 41 and 42, respectively. In the drawings conduits 45 and 46 are indicated leading to a cylinder 47 in which a piston 48 is movable. A piston rod 49 connects the piston with a control surface 50 through a link 51.

Figure 2:
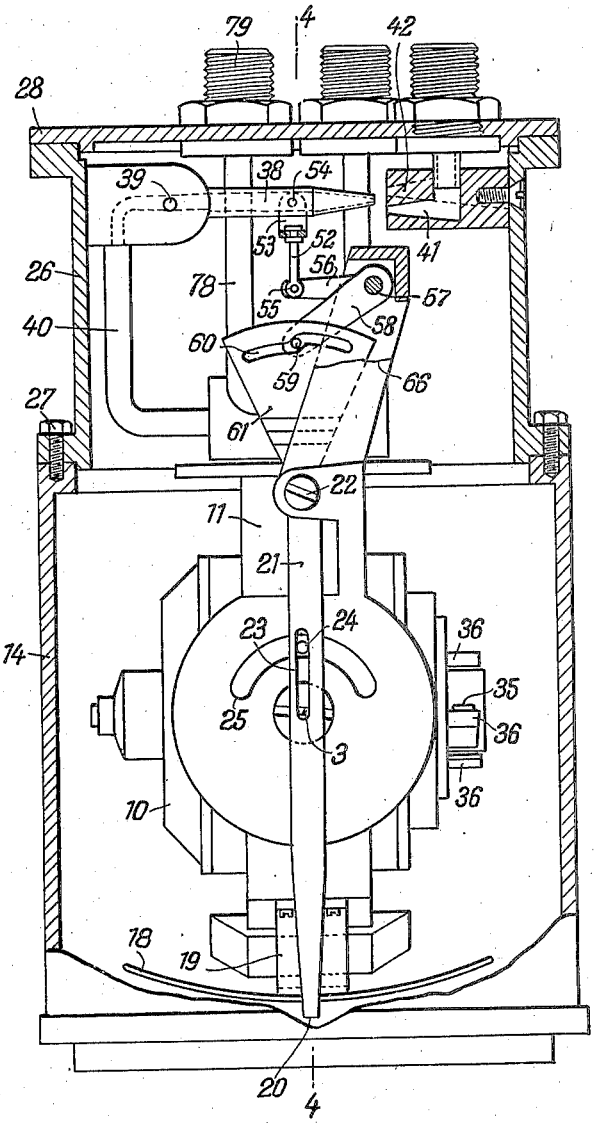
Fig. 2 is a sectional elevation of the instrument shown in Fig. 1.

For actuating the relay a motion transmitting member 52 is provided rotatably engaging a fork 53 which is pivotally connected to the movable part of the relay, the jet pipe 38, at 54. The other end of the motion transmitting member 52 is pivotally connected at 55 to a single armed lever 56, the lever being secured to a shaft 57. To the shaft a second lever 58 is secured having a pin 59 engaging a cam opening 60 in a sector shaped cam member 61 dovetailed to the arm 23 at 62. The shaft 57 is pivotally mounted at 63 and 64 in an arm 65 secured to or integral with the gimbal ring 11. In Fig. 2 a part of the arm is broken away at 66 to show the cam opening 60.

When the rotor bearing casing 10 tilts about the axis 3—3, the arm 21 is actuated moving the member 61 and causing the pin 59 to move into the inner or outer concentric part of the cam opening 60. The levers 56 and 58 are turned in one direction or the other in response to the movements of the pin 59 causing the jet-pipe to register with one or the other of the orifices 41 and 42, thereby setting up pressures in the same which are a function of the movements of the gyroscope about the minor axis.

When at the same time the gyroscope tilts about the major axis 4—4, the relay 38 will not be affected as in response to such movements the motion transmitting member 52 may freely rotate relatively to the fork 53 without moving the jet-pipe. The motion transmitting member 52 together with the fork 53 constitutes a universal joint transmitting only axial but no rotary movements of the motion transmitting member.

Figure 3:
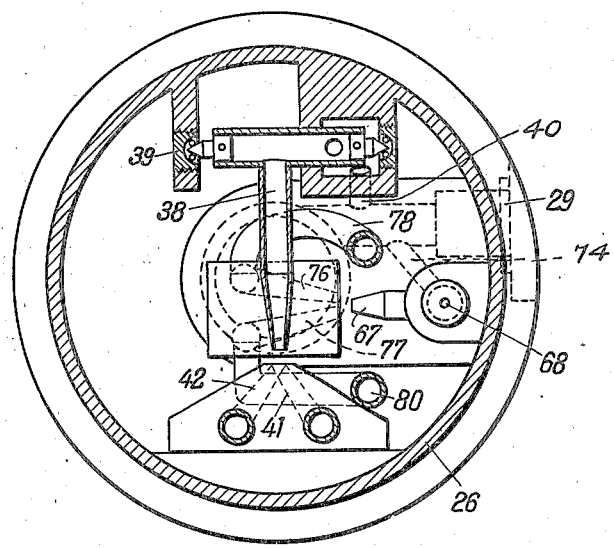
Fig. 3 is a section taken on line 2—2 of Fig. 1.

In the illustrated embodiment a second relay or pick-off is provided for creating pressure impulses in response to movements of the gyroscope about the major axis 4—4. A jet-pipe 67 pivoted at 68 and 69 is actuated by a lever 70 having a pin 71 guided in a curved notch 72 of a disk 73, the disk being rigidly secured to the gimbal ring 11. Air is supplied to the jet-pipe through an opening 74 and a passage 75. Pressure impulses will thus be created in the reception orifices associated with the jet-pipe 67 and visible more particularly on Fig. 3 at 76 and 77. A conduit 78 leads to a pipe coupling 79. A second conduit 80 connects the reception orifice 77 with a further pipe coupling not visible on the drawing.

In Fig. 2 the cam opening 60 is shown as comprising two sections concentric to the axis 22. It is apparent that upon a relatively slight movement of the gyroscope about its minor axis the pin 59 will be moved into one or the other of the concentric section, thereby moving the relay into one or the other extreme position in which the jet-pipe fully registers with respective reception orifice. This form of the slot is preferred in automatic steering devices where it is desirable to obtain strong impulses for actuating the rudder upon relatively small deviations from the predetermined course or attitude.

Figure 4:
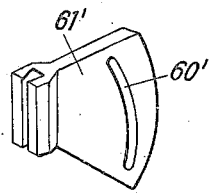
Fig. 4 is a perspective view of an element of the instrument shown in Fig. 1.

A modified form of a cam member is shown in Fig. 4, wherein the cam opening 60' in the member 61' is continuously curved, causing the relay to assume a definite position for each position of the rotor bearing member relatively to the gimbal ring. This form is preferred for operating remote indicators.

Figure 5:
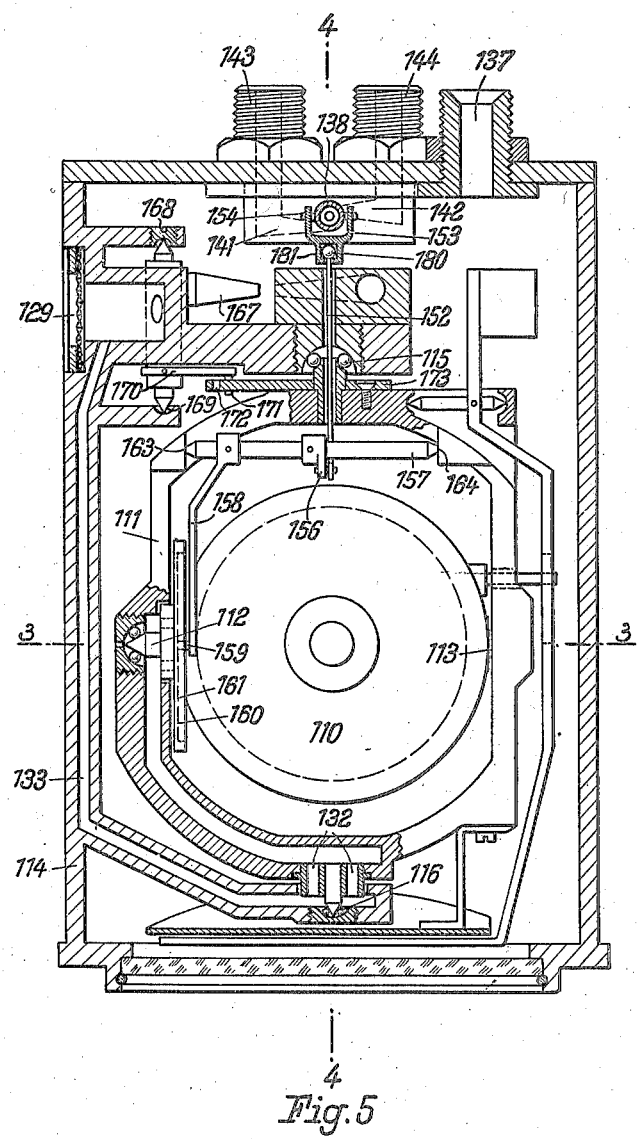
Fig. 5 is another embodiment of this invention.

Another embodiment of this invention is shown in Fig. 5. A rotor bearing casing 110 is mounted in a gimbal ring 111 in bearings 112 and 113 defining the minor axis 3—3. The gimbal ring, in turn, is mounted in an instrument casing 114 in bearings 115 and 116 defining the major axis 4—4. Air is supplied to the gyro rotor through a screened aperture 129, a conduit 133, and passages 132 into a conduit in the gimbal ring, whence it reaches the interior of the rotor bearing casing 110 through similar passages in the bearing 112. Air is withdrawn from the instrument casing through a pipe coupling 137.

To the rotor bearing casing a disk 161 is secured having a groove 160 in which a pin 159 of a lever 158 is guided. The lever is secured to a shaft 157 mounted for movement in bearings 163 and 164 and carries a second lever 156 to which a rod 152 is pivotally connected. The other end of the rod terminates in a ball 180 forming a universal joint with a socket 139, the construction of which is in all other respects similar to the jet-pipe 36 shown in Fig. 1. Reception conduits 141 and 142 lead to pipe couplings 143 and 144.

A second jet-pipe relay including a movable jet-pipe 167 pivoted at 168 and 169 is provided for creating pressure impulses in response to movements of the gyroscope about the major axis. A lever 170 is for this purpose provided for moving the jet-pipe, the lever having a pin 171 guided in a cam opening 172 of a disk 173.

Upon a movement of the gyroscope about the major axis 3—3 the levers 158 and 156 will cause the rod to move back and forth through the central opening of the bearing 115. The relay 138 will not be affected by movements of the gyroscope about the major axis 4—4, the ball and socket joint 180 and 181 permitting a rotary movement of the rod 152 relatively to the fork 153.

The differential pressure impulses created by the respective relay may be utilized to operate remote indicators or an automatic steering device in a well-known manner.

Obviously, the present invention is not restricted to the particular embodiment herein shown and described. Moreover, it is not indispensable that all the features of this invention be used conjointly, since they may be employed advantageously in various combinations and sub-combinations.

What is claimed is:

1. Gyroscopic apparatus comprising, in combination, an instrument support; a gimbal ring mounted on said support for movement about a first axis; a rotor bearing member mounted in said gimbal ring for movement about a second axis normal to said first axis; a gyro rotor mounted in said bearing member for spinning about a third axis; a pick-off movably mounted on said support; a motion transmitting member disposed coaxially with said first axis and connected to said pick-off to move the same; a lever pivoted on said gimbal ring, means for oscillating said lever by a relative tilting of said rotor bearing member and gimbal ring about said second axis, means for connecting said lever to said motion transmitting member to move the same axially in the direction of the first axis upon oscillation of said lever, thereby actuating the pick-off without interfering with the movements of the bearing member about either axis.

2. Gyroscopic apparatus comprising, in combination, an instrument support; a gimbal ring mounted on said support for movement about a first axis; a rotor bearing member mounted in said gimbal ring for movement about a second axis normal to said first axis; a gyro rotor mounted in said bearing member for spinning about a third axis; a relay mounted on said support; a motion transmitting member disposed coaxially with said first axis and connected to actuate said relay; a lever pivotally mounted on said gimbal ring said lever having a slot; a pin on said rotor bearing member engaging said slot for actuating said lever; and means for transmitting movements of said lever into movements directed coaxially with said first axis said means being connected to move said motion transmitting member in the direction of the first axis, thereby actuating the relay without interfering with the movements of the bearing member about the first and second axes.

3. Gyroscopic apparatus comprising, in combination, an instrument support; a gimbal ring mounted on said support for movement about a first axis; a rotor bearing member mounted in said gimbal ring for movement about a second axis normal to said first axis; a gyro rotor mounted in said bearing member for spinning about a third axis; a relay mounted on said support; a motion transmitting member disposed coaxially with said first axis and connected to actuate said relay; a lever pivotally mounted on said gimbal ring said lever having a slot; a pin on said rotor bearing member engaging said slot for actuating said lever; a cam moved by said lever; an angle lever mounted on said gimbal ring engaging the surface of said cam and connected to move said motion transmitting member in the direction of the first axis, thereby actuating the relay without interfering with the movements of the bearing member about the first and second axes.

4. Gyroscopic apparatus comprising, in combination, an instrument support; a gimbal ring mounted on said support for movement about a first axis; a rotor bearing member mounted in said gimbal ring for movement about a second axis normal to said first axis; a gyro rotor mounted in said bearing member for spinning about a third axis; a relay mounted on said support; motion transmitting means disposed substantially coaxially with the first axis and including a universal joint said means being connected to actuate said relay; and means carried by said gimbal ring and actuated by a relative movement of said rotor bearing member and gimbal ring about said second axis for moving said motion transmitting means axially in the direction of the first axis, thereby actuating the relay without interfering with the movement of the bearing member about the first and second axes.

5. Artificial horizon comprising, in combination, an instrument casing; a gimbal ring mounted in said casing for movement about a first substantially horizontal axis; a rotor bearing member mounted in said gimbal ring for movement about a second substantially horizontal axis normal to said first axis; a gyro rotor mounted in said bearing member for spinning about a normally horizontal axis; a pointer arm pivotally mounted on said gimbal ring said arm having a slot; a pin on said rotor bearing member engaging said slot for actuating said pointer arm; a cam surface on said arm; a relay mounted in said casing; and motion transmitting means disposed substantially coaxially with the first axis and including a universal joint for actuating said relay, said means being arranged to be actuated by the cam surface.

6. Gyroscopic apparatus comprising, in combination, an instrument support; a gimbal ring; pivot bearings for mounting said gimbal ring on said support for movement about a first axis, a rotor bearing member mounted in said gimbal ring for movement about a second axis normal to the first axis; a gyro rotor mounted in said bearing member for spinning about a third axis; an air flow pick-off movably mounted on said support; a motion transmitting member disposed coaxially with said first axis, and connected to said pick-off to actuate the same, a horizon bar pivoted on said gimbal ring, means connecting said bar and bearing member to be actuated by a relative movement of said rotor bearing member and gimbal ring about said second axis, and a rock shaft connected to said motion transmitting member and said bar for moving said member in the direction of the first axis.

7. Gyroscopic apparatus comprising, in combination, an instrument support; a gimbal ring; pivot bearings for mounting said gimbal ring on said support for movement about a first axis, at least one of said pivot bearings having a central opening; a rotor bearing member mounted in said gimbal ring for movement about a second axis normal to the first axis; a gyro rotor mounted in said bearing member for spinning about a third axis; a rod disposed coaxially with said first axis and extending through the opening in one pivot bearing; a universal joint connected to one end of said rod; a relay mounted on said support and connected to be actuated by axial movements of said rod and joint; and means carried by said gimbal ring and actuated by a relative movement of said rotor bearing member and gimbal ring about said second axis for moving said motion transmitting rod and joint in the direction of the first axis, thereby actuating the relay without interfering with the movements of the bearing member about the first and second axes.

8. An air flow pick-off for both axes of a gyroscopic artificial horizon mounted within its casing with its major axis fore and aft and its minor axis athwartships, and having a horizon bar, a jet pipe pivoted through a hollow shaft parallel to said major axis, means for oscillating said pipe by relative tilting of the said casing about said major axis, a second jet pipe pivoted through a hollow shaft parallel to said minor axis and means for rocking said last named pipe upon tilting of said casing about said minor axis including a rod in line with said major axis and means connecting said bar and rod for axially sliding the rod upon relative up and down movement of the bar.

9. An air flow pick-off for both axes of a gyroscopic artificial horizon mounted within its casing with its major axis fore and aft and its minor axis athwartships, a jet pipe pivoted through a hollow shaft parallel to said major axis, means for oscillating said pipe by relative tilting of said casing about said major axis, a second jet pipe pivoted through a hollow shaft parallel to said minor axis, and means for rocking said last named pipe upon tilting of said casing about said minor axis including a rod in line with said major axis and extending through the aft major pivotal axis of said casing, a rock shaft connected to said rod to slide the same axially, and means connecting said shaft and casing to rock the same upon relative tilting of the casing about its minor axis.

GERT ZOEGE von MANTEUFFEL.